US009948229B2

(12) United States Patent
Ide

(10) Patent No.: US 9,948,229 B2
(45) Date of Patent: Apr. 17, 2018

(54) ELECTRIC VEHICLE

(71) Applicant: TOYOTA JIDOSHA KABUSHIKI KAISHA, Toyota-shi, Aichi-ken (JP)

(72) Inventor: Akihiko Ide, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 15/474,000

(22) Filed: Mar. 30, 2017

(65) Prior Publication Data

US 2017/0302216 A1 Oct. 19, 2017

(30) Foreign Application Priority Data

Apr. 15, 2016 (JP) ................................ 2016-081967

(51) Int. Cl.
| | |
|---|---|
| *B60L 11/18* | (2006.01) |
| *H02P 29/024* | (2016.01) |
| *H02P 27/08* | (2006.01) |
| *H02P 5/74* | (2006.01) |
| *B60L 3/00* | (2006.01) |

(52) U.S. Cl.
CPC ............ *H02P 29/024* (2013.01); *B60L 3/003* (2013.01); *B60L 11/1803* (2013.01); *H02P 5/74* (2013.01); *H02P 27/08* (2013.01); *B60L 2240/12* (2013.01); *B60L 2240/24* (2013.01); *B60L 2240/526* (2013.01); *B60Y 2200/122* (2013.01)

(58) Field of Classification Search
CPC .......... H02P 29/024; H02P 5/74; H02P 27/08; B60L 11/1803; B60L 3/003; B60L 2240/526; B60L 2240/24; B60L 2240/12; B60Y 2200/122
See application file for complete search history.

(56) References Cited

U.S. PATENT DOCUMENTS

| | | | | |
|---|---|---|---|---|
| 6,518,736 | B2 * | 2/2003 | Sasaki ................... | B60K 6/365 290/40 C |
| 6,930,460 | B2 * | 8/2005 | Ishikawa ............... | B60L 3/0046 318/108 |
| 7,764,051 | B2 * | 7/2010 | Ishikawa ................. | B60K 6/26 322/29 |
| 8,045,301 | B2 * | 10/2011 | Shiba ...................... | B60L 3/003 318/800 |

(Continued)

FOREIGN PATENT DOCUMENTS

| | | |
|---|---|---|
| JP | 2012-096703 A | 5/2012 |
| JP | 2013-251991 A | 12/2013 |

*Primary Examiner* — Jacob B Meyer
(74) *Attorney, Agent, or Firm* — Oliff PLC

(57) ABSTRACT

An electric vehicle includes: a first inverter circuit; a second inverter circuit; an inverter control device that outputs first switching signals to the first inverter circuit and second switching signals to the second inverter circuit; first signal lines that transfer the first switching signals to the first inverter circuit; second signal lines that transfer the second switching signals to the second inverter circuit; and a signal blocking circuit inserted in the first signal lines and the second signal lines, the signal blocking circuit being configured to output to the first inverter circuit first OFF signals in place of the first switching signals, and outputting to the second inverter circuit second OFF signals in place of the second switching signals, when receiving at least one of the first abnormality signal and the second abnormality signal.

4 Claims, 16 Drawing Sheets

(56) References Cited

U.S. PATENT DOCUMENTS

| | | | | |
|---|---|---|---|---|
| 8,598,826 B2* | 12/2013 | Danjo | ............ | B60L 3/003 318/400.02 |
| 8,660,755 B2* | 2/2014 | Kuroda | ............ | B62D 5/0481 180/443 |
| 9,018,880 B2* | 4/2015 | Hayashi | ............ | H02P 25/22 318/400.27 |
| 9,124,207 B2* | 9/2015 | Hayashi | ............ | H02P 6/20 |
| 2002/0070715 A1* | 6/2002 | Sasaki | ............ | B60K 6/365 322/28 |
| 2009/0195199 A1* | 8/2009 | Ito | ............ | B60L 3/003 318/400.22 |
| 2009/0251831 A1* | 10/2009 | Shiba | ............ | B60L 3/003 361/30 |
| 2010/0060222 A1* | 3/2010 | Kezobo | ............ | G01R 31/42 318/490 |
| 2010/0263953 A1* | 10/2010 | Shimana | ............ | B60K 6/26 180/65.285 |
| 2011/0074333 A1* | 3/2011 | Suzuki | ............ | B62D 5/0403 318/724 |
| 2011/0241589 A1* | 10/2011 | Danjo | ............ | B60L 3/003 318/453 |
| 2013/0090809 A1* | 4/2013 | Kuroda | ............ | B62D 5/0481 701/41 |
| 2015/0340966 A1 | 11/2015 | Mutsuura et al. | | |
| 2016/0142000 A1* | 5/2016 | Oba | ............ | H02P 29/021 318/400.04 |
| 2016/0325777 A1* | 11/2016 | Mori | ............ | H02P 25/22 |

* cited by examiner

FIG. 9

| FLL | FLR | SB1~SB6 SB7~SB12 | SA1~SA6 SA7~SA12 |
|---|---|---|---|
| H | H | H | L |
| H | H | L | L |
| H | L | H | L |
| H | L | L | L |
| L | H | H | L |
| L | H | L | L |
| L | L | H | H |
| L | L | L | L |

FIG. 13

| LINK | FLL | FLR | SB1~SB6 | SA1~SA6 | SB7~SB12 | SA7~SA12 |
|---|---|---|---|---|---|---|
| H | H | H | H | L | H | L |
| H | H | H | L | L | L | L |
| H | H | L | H | L | H | L |
| H | H | L | L | L | L | L |
| H | L | H | H | L | H | L |
| H | L | H | L | L | L | L |
| H | L | L | H | H | H | H |
| H | L | L | L | L | L | L |
| L | H | H | H | L | H | L |
| L | H | H | L | L | L | L |
| L | H | L | H | L | H | H |
| L | H | L | L | L | L | L |
| L | L | H | H | H | H | L |
| L | L | H | L | L | L | L |
| L | L | L | H | H | H | H |
| L | L | L | L | L | L | L |

ELECTRIC VEHICLE

INCORPORATION BY REFERENCE

The disclosure of Japanese Patent Application No. 2016-081967 filed on Apr. 15, 2016 including the specification, drawings and abstract is incorporated herein by reference in its entirety.

BACKGROUND

1. Technical Field

The present disclosure relates to an electric vehicle. The electric vehicle as used in this specification broadly refers to a vehicle having a motor that drives wheels. Example of the electric vehicle include electric vehicles using a battery as a power source, electric vehicles (so-called fuel-cell vehicles) using fuel cells as a power source, and electric vehicles (so-called hybrid vehicles) having not only a motor but also a prime mover such as an engine.

2. Description of Related Art

An electric vehicle is disclosed in JP2013-251991 A. The electric vehicle includes a first motor that drives one wheel out of a pair of left and right wheels, a second motor that drives the other wheel out of the pair of left and right wheels, and a first inverter circuit having a plurality of switching elements, the first inverter circuit supplying alternating current (Hereinafter, referred to as AC) electric power to the first motor. The electric vehicle also includes a second inverter circuit having a plurality of switching elements, the second inverter circuit supplying AC electric power to the second motor, and an inverter control device that controls operation of the first inverter circuit and the second inverter circuit.

SUMMARY

In the above-mentioned electric vehicle, appropriate control of both the first motor and the second motor achieves appropriate execution of such operation as moving forward, moving backward, taking a turn, and stop. Therefore, when abnormality occurs in, for example, the first inverter circuit, appropriate control of the first motor may fail, which may lead to unintended behavior of the electric vehicle. Accordingly, when abnormality occurs in the first inverter circuit, it is considered to turn off the plurality of switching elements of the first inverter circuit to stop electric power supply to the first motor. However, even with the electric power supply to the first motor being stopped, the electric vehicle may still demonstrate unintended behavior if electric power supply to the second motor is continued. Accordingly, when abnormality occurs in the first inverter circuit, it is effective to turn off not only the plurality of switching elements of the first inverter circuit but also the plurality of switching elements of the second inverter circuit. Similarly, when abnormality occurs in the second inverter circuit, it is effective to turn off not only the plurality of switching elements of the second inverter circuit but also the plurality of switching elements of the first inverter circuit.

In consideration of the above circumstances, it is preferable that the inverter control device concurrently executes the processing of turning off the plurality of switching elements of the first inverter circuit and the processing of turning off the plurality of switching elements of the second inverter circuit, when abnormality occurs in one of the first inverter circuit and the second inverter circuit. However, the inverter control device is generally configured using a microcomputer or other processors to sequentially execute a plurality of preset processings one at a time based on preinstalled programs. Therefore, the processing of turning off the plurality of switching elements of the first inverter circuit and the processing of turning off the plurality of switching elements of the second inverter circuit are executed at different timings in a strict sense. As a result, a measurable time difference is generated between the timings of executing the two processings. That is, during the time difference, electric power supply to one motor is stopped, while electric power supply to the other motor is continued, which may cause unintended behavior of the electric vehicle.

The present disclosure provides a technology capable of turning off a plurality of switching elements of both the first inverter circuit and the second inverter circuit when abnormality occurs in one of the inverter circuits.

An electric vehicle according to an aspect of the present disclosure includes: a vehicle body; a pair of wheels provided in a vehicle width direction of the vehicle body; a first motor that drives one of the wheels; a second motor that drives the other of the wheels; a first inverter circuit having a plurality of first switching elements, the first inverter circuit being configured to supply alternating current electric power to the first motor; a second inverter circuit having a plurality of second switching elements, the second inverter circuit being configured to supply alternating current electric power to the second motor; an inverter control device configured to output first switching signals that control operation of the plurality of first switching elements and second switching signals that control operation of the plurality of second switching elements; a first abnormality detection device configured to output a first abnormality signal when abnormality occurs in the first inverter circuit; a second abnormality detection device configured to output a second abnormality signal when abnormality occurs in the second inverter circuit; a plurality of first signal lines configured to transfer the first switching signals from the inverter control device to the first inverter circuit; a plurality of second signal lines configured to transfer the second switching signals from the inverter control device to the second inverter circuit; and a signal blocking circuit inserted in the plurality of first signal lines and the plurality of second signal lines. The signal blocking circuit receives input of the first abnormality signal and the second abnormality signal, and the signal blocking circuit is configured to output to the first inverter circuit first OFF signals in place of the first switching signals from the inverter control device, and outputting to the second inverter circuit second OFF signals in place of the second switching signals from the inverter control device, when receiving at least one of the first abnormality signal and the second abnormality signal. The first OFF signals are signals of turning off the plurality of first switching elements, and the second OFF signals are signals of turning off the plurality of second switching elements.

According to the aforementioned configuration, when both the first inverter circuit and the second inverter circuit are normal, the first switching signals output from the inverter control device are input into the first inverter circuit through the plurality of first signal lines, and the second switching signals output from the inverter control device are input into the second inverter circuit through the second signal lines. Accordingly, the operation of the first motor and the second motor is controlled by the inverter control device. When abnormality occurs in at least one of the first inverter circuit and the second inverter circuit, at least one of the first abnormality signal and the second abnormality signal is input into the signal blocking circuit. The signal blocking circuit is interposed in the plurality of first signal lines and the plurality of second signal lines. When at least one of the first abnormality signal and the second abnormality signal is received, first OFF signals and second OFF signals are output in place of the first switching signals and the second switching signals output from the inverter control device. The first OFF signal turns off the plurality of first switching elements of the first inverter circuit, and the second OFF signal turns off the plurality of second switching elements of the second inverter circuit. Accordingly, when abnormality occurs in at least one of the first inverter circuit and the second inverter circuit, the plurality of switching elements of both the inverter circuits can concurrently be turned off irrespective of the first and second switching signals output by the inverter control device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a truth table of the signal blocking circuit 50 in the first embodiment;

FIG. 13 is a truth table of the signal blocking circuit 150 in the second embodiment;

DETAILED DESCRIPTION OF EMBODIMENTS

First Embodiment

Figure 1:
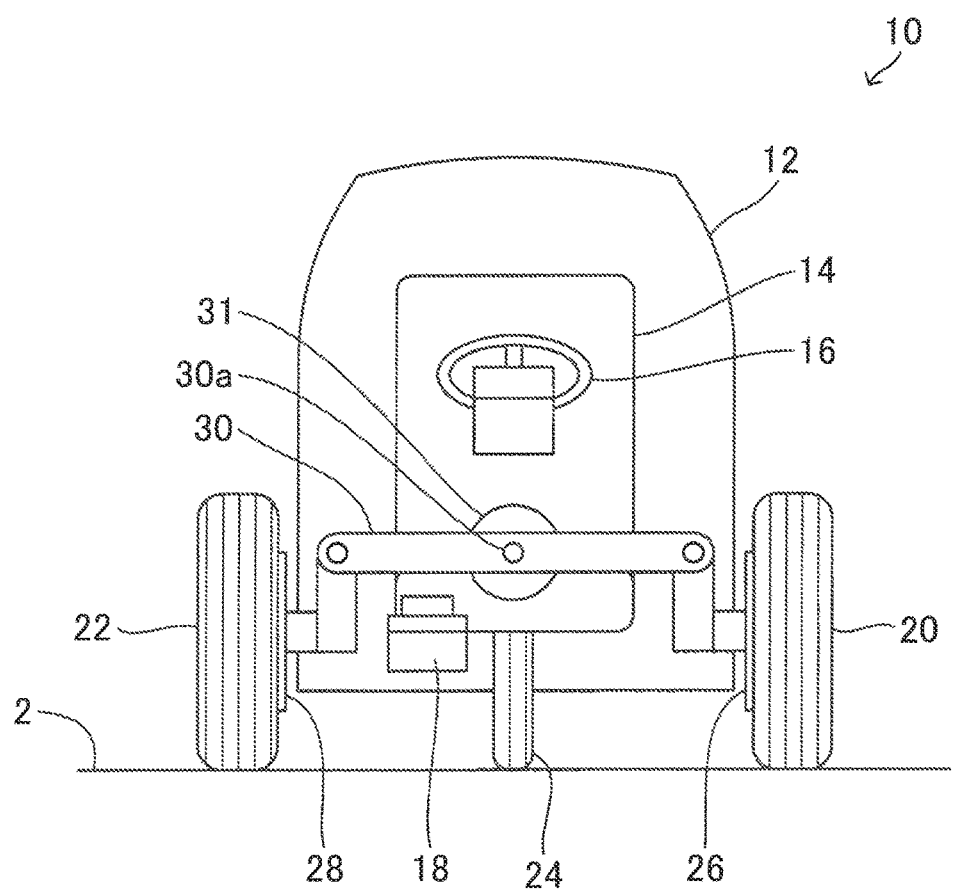
FIG. 1 is a from view schematically illustrating an electric vehicle 10.
Figure 2:
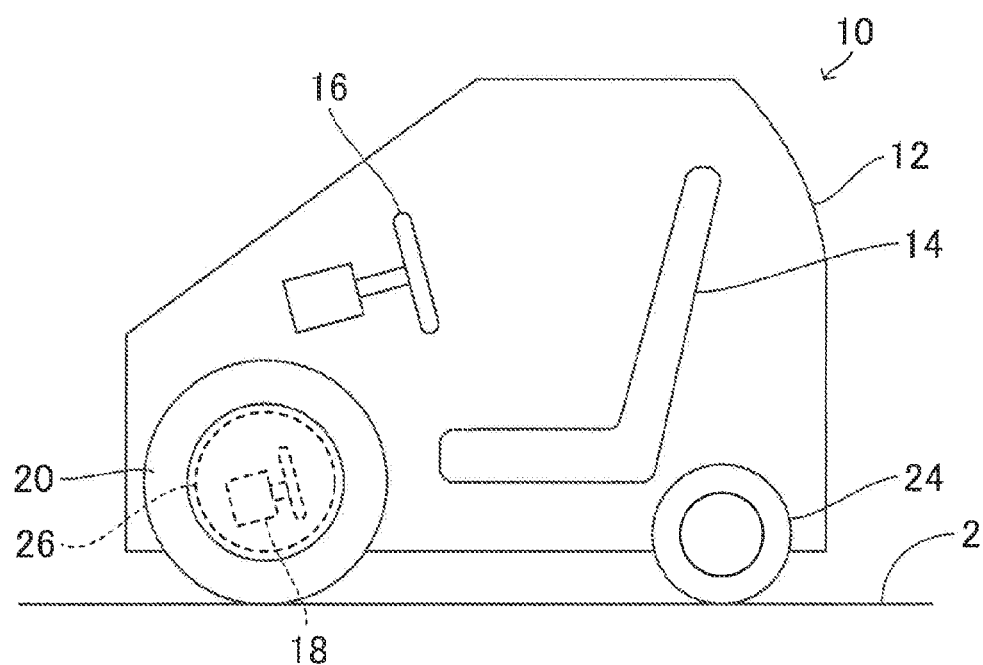
FIG. 2 is a side view schematically illustrating the electric vehicle 10.

The electric vehicle 10 of an embodiment will be described with reference to the drawings. As illustrated in FIGS. 1 and 2, the electric, vehicle 10 includes a vehicle body 12, a pair of left and right wheels 20, 22, and a single idler wheel 24. The vehicle body 12 has a size and a form capable of accommodating a driver. The vehicle body 12 is provided with a seat 14 for the driver to sit down. The vehicle body 12 is also provided with a steering device 16 and an accelerator device 18. The steering device 16 is an operation unit operated by the driver to steer the electric vehicle 10. The steering device 16 outputs a steering signal in accordance with the operation applied by the driver. The accelerator device 18 is an operation unit operated by the driver to accelerate the electric vehicle 10. The accelerator device 18 outputs an accelerator signal in accordance with the operation applied by the driver.

The pair of left and right wheels 20, 22 include a left wheel 20 and a right wheel 22. The left wheel 20 is positioned on one side (left side) in a width direction of the vehicle body 12. The right wheel 22 is positioned on the other side (right side) in the width direction of the vehicle body 12. The idler wheel 24 is positioned at the center in the width direction of the vehicle body 12. The rotating shafts of the left wheel 20, the right wheel 22, and the idler wheel 24 are each parallel to the width direction of the vehicle body 12. In one example, in the electric vehicle 10 of the present embodiment, the pair of left and right wheels 20, 22 are positioned in a front part of the vehicle body 12, and the idler wheel 24 is positioned in a rear part of the vehicle body 12. The electric vehicle 10 may have four or more wheels instead of three wheels described above. Or the electric vehicle 10 may have only the pair of left and right wheels 20, 22, and the idler wheel 24 may be omitted.

The electric vehicle 10 includes a first motor 26 that drives the left wheel 20, and a second motor 28 that drives the right wheel 22. In the electric vehicle 10, the pair of left and right wheels 20, 22 are individually driven by motors different from each other. The electric vehicle 10 goes straight by driving the left wheel 20 and the right wheel 22 at the same speed. The electric vehicle 10 makes a turn by driving the left wheel 20 and the right wheel 22 at different speeds. In one example, the first motor 26 and the second motor 28 in the present embodiment are in-wheel motors. The first motor 26 is disposed on a hub of the left wheel 20, and the second motor 28 is disposed on a hub of the right wheel 22. The first motor 26 and the second motor 28 in the present embodiment are permanent magnet-type synchronous motors.

Figure 3:
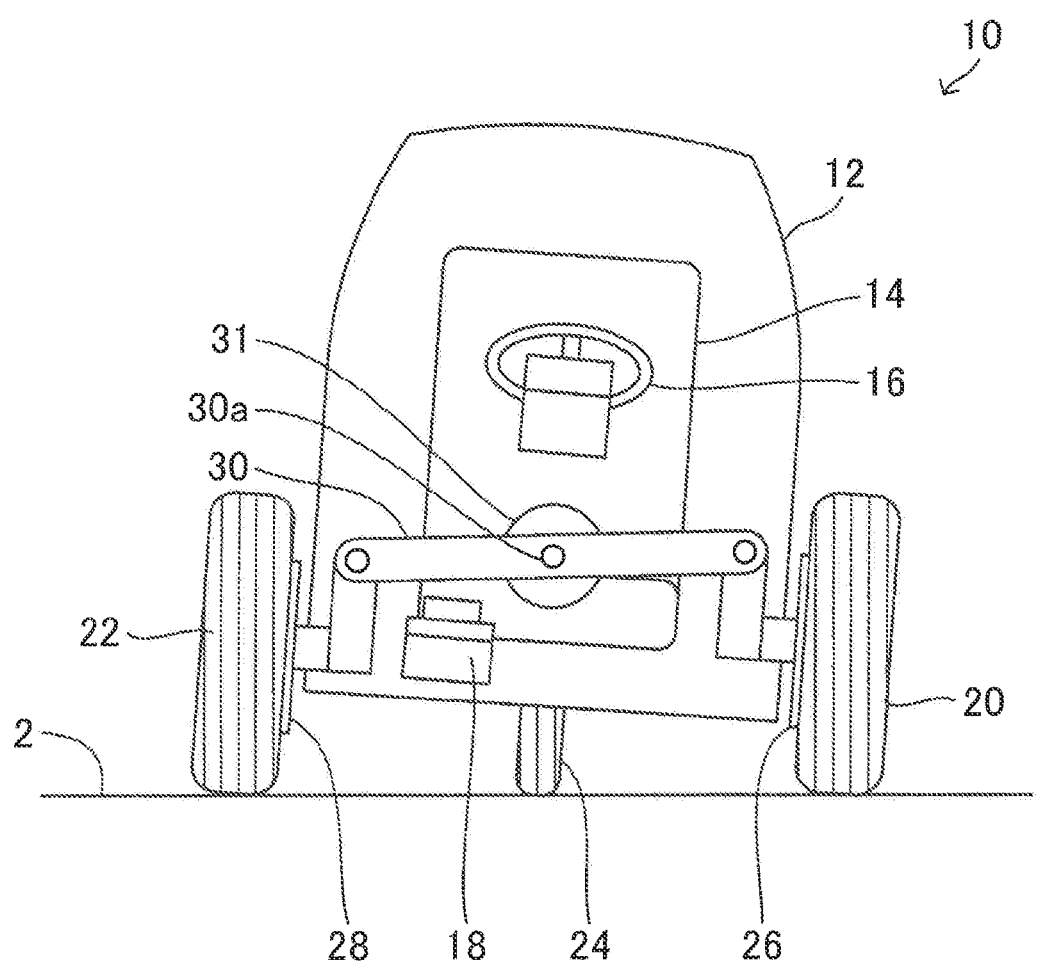
FIG. 3 is a front view illustrating the electric vehicle 10 that regulates a lean angle in accordance with centrifugal force at the time of turning.
Figure 4:
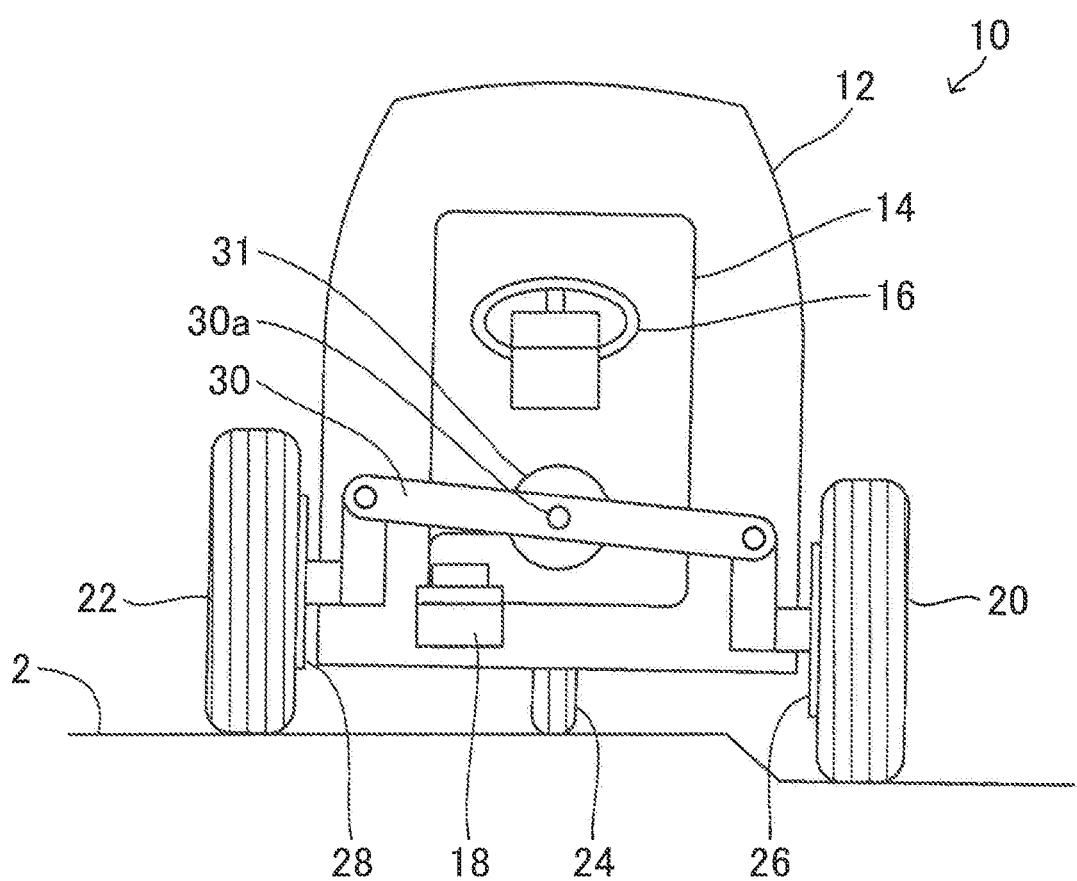
FIG. 4 is a front view illustrating the electric vehicle 10 that regulates the lean angle in accordance with the asperity of a road surface.

The electric vehicle 10 includes a seesaw arm 30 and a lean actuator 31. The seesaw arm 30, which is a member extending in the width direction of the vehicle body 12, is supported swingably to the vehicle body 12. A swing shaft 30a of the seesaw arm 30 is parallel to a cross direction of the vehicle body 12, and is positioned at the center of the width direction of the vehicle body 12. One end of the seesaw arm 30 is coupled with the left wheel 20, while the other end of the seesaw arm 30 is coupled with the right wheel 22. The lean actuator 31 is an actuator that swings the seesaw arm 30 relative to the vehicle body 12. As illustrated in FIGS. 3 and 4, when the lean actuator 31 swings the seesaw arm 30, a vertical position of the pair of left and right wheels 20, 22 relative to the vehicle body 12 changes. Accordingly, when the electric vehicle 10 makes a turn for example, the vehicle body 12 can be tilted in the width direction in accordance with the centrifugal force acting on the vehicle body 12 (see FIG. 3). Or when the electric vehicle 10 travels on a road surface 2 that is not flat, the pair of left and right wheels 20, 22 are moved up and down in accordance with the asperity of the road surface, which can prevent the vehicle body 12 from swinging. A swing angle of the seesaw arm 30 relative to the vehicle body 12 is called a lean angle.

Figure 5:
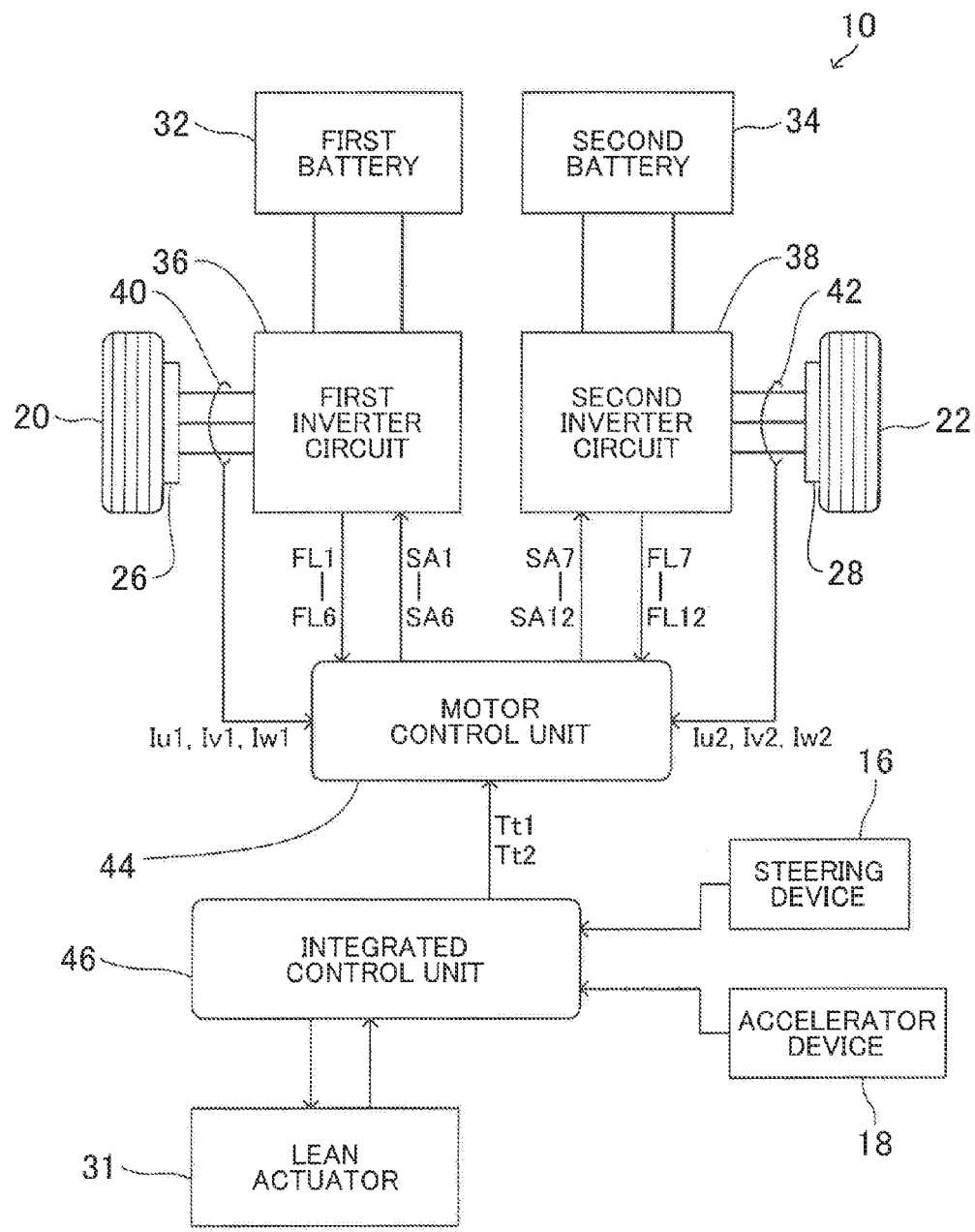
FIG. 5 is a block diagram illustrating an electric configuration of the electric vehicle 10.

Next, an electric configuration of the electric vehicle 10 will be described with reference to FIGS. 5 to 8. As illustrated in FIG. 5, the electric vehicle 10 includes a first battery 32 and a second battery 34. The first battery 32 is a DC electric power supply that supplies electric power to the first motor 26. The second battery 34 is a DC electric power supply that supplies electric power to the second motor 28. The first battery 32 and the second battery 34 each have a plurality of secondary battery cells, such as lithium ion battery cells. One of or both the first battery 32 and the second battery 34 may be DC electric power supplies of other types, such as fuel batteries or solar batteries. The electric vehicle 10 does not necessarily require two direct current (hereinafter, referred to as DC) electric power supplies, but may include at least one DC electric power supply that supplies electric power to the first motor 26 and the second motor 28. The DC electric power supply used herein includes, for example, a combination of a power generator driven by an engine and an AC-DC converter.

The electric vehicle 10 includes a first inverter circuit 36 and a second inverter circuit 38. The first inverter circuit 36 is provided between the first battery 32 and the first motor 26. The first inverter circuit 36 converts the DC electric power from the first battery 32 into AC electric power, and the AC electric power is supplied to the first motor 26. Similarly, the second inverter circuit 38 is provided between the second battery 34 and the second motor 28. The second inverter circuit 38 converts the DC electric power from the second battery 34 into AC electric power, and supplies the AC electric power to the second motor 28. Here, the first motor 26 and the second motor 28 are three-phase motors, and the first inverter circuit 36 and the second inverter circuit 38 are three-phase inverters. That is, the first inverter circuit 36 and the second inverter circuit 38 supply the three-phase AC electric power having a U phase, a V phase, and a W phase to the first motor 26 and the second motor 28, respectively.

The electric vehicle 10 includes a first current sensor 40 and a second current sensor 42. The first current sensor 40 detects three-phase AC components Iu1, Iv1, and Iw1 that flow into the first motor 26, respectively. The second current sensor 42 detects three-phase AC components Iu2, Iv2, and Iw2 that flow into the second motor 28, respectively. The specific configuration of the first current sensor 40 and the second current sensor 42 is not particularly limited. In one example, the first current sensor 40 and the second current sensor 42 may be configured with a plurality of current detection elements such as Hall elements, respectively.

The electric vehicle 10 includes a motor control unit 44 and an integrated control unit 46. The motor control unit 44 and the integrated control unit 46 are communicably connected with each other. The integrated control unit 46 is also connected with a steering device 16 and an accelerator device 18. The aforementioned steering signal and accelerator signal are input into the integrated control unit 46. The integrated control unit 46 determines a torque target value Tt1 of the first motor 26 and a torque target value Tt2 of the second motor 28 in accordance with the steering signal, the accelerator signal, and other vehicle states. The determined torque target values Tt1, Tt2 are notified to the motor control unit 44. The integrated control unit 46 is also communicably connected with a lean actuator 31. Controlling the operation of the lean actuator 31 enables the integrated control unit 46 to regulate a lean angle of the vehicle body 12.

The motor control unit 44 outputs a plurality of first control signals SA1 to SA6 to the first inverter circuit 36 so as to control the operation of the first inverter circuit 36. As a result, the operation of the first motor 26 is controlled. The motor control unit 44 also outputs a plurality of second control signals SA7 to SA12 to the second inverter circuit 38 so as to control the operation of the second inverter circuit 38. As a result, the operation of the second motor 28 is controlled. The motor control unit 44 is connected to the first current sensor 40 and the second current sensor 42, so that the current values Iu1, Iv1, Iw1 of the first motor 26 and current values Iu2, Iv2, and Iw2 of the second motor 28 are input into the motor control unit 44. The motor control unit 44 also receives input of later-described first supervisory signals FL1 to FL6 and second supervisory signals FL7 to FL12. Based on the various input indexes, the motor control unit 44 generates and outputs a plurality of first control signals SA1 to SA6 and a plurality of second control signals SA7 to SA12.

Figure 6:
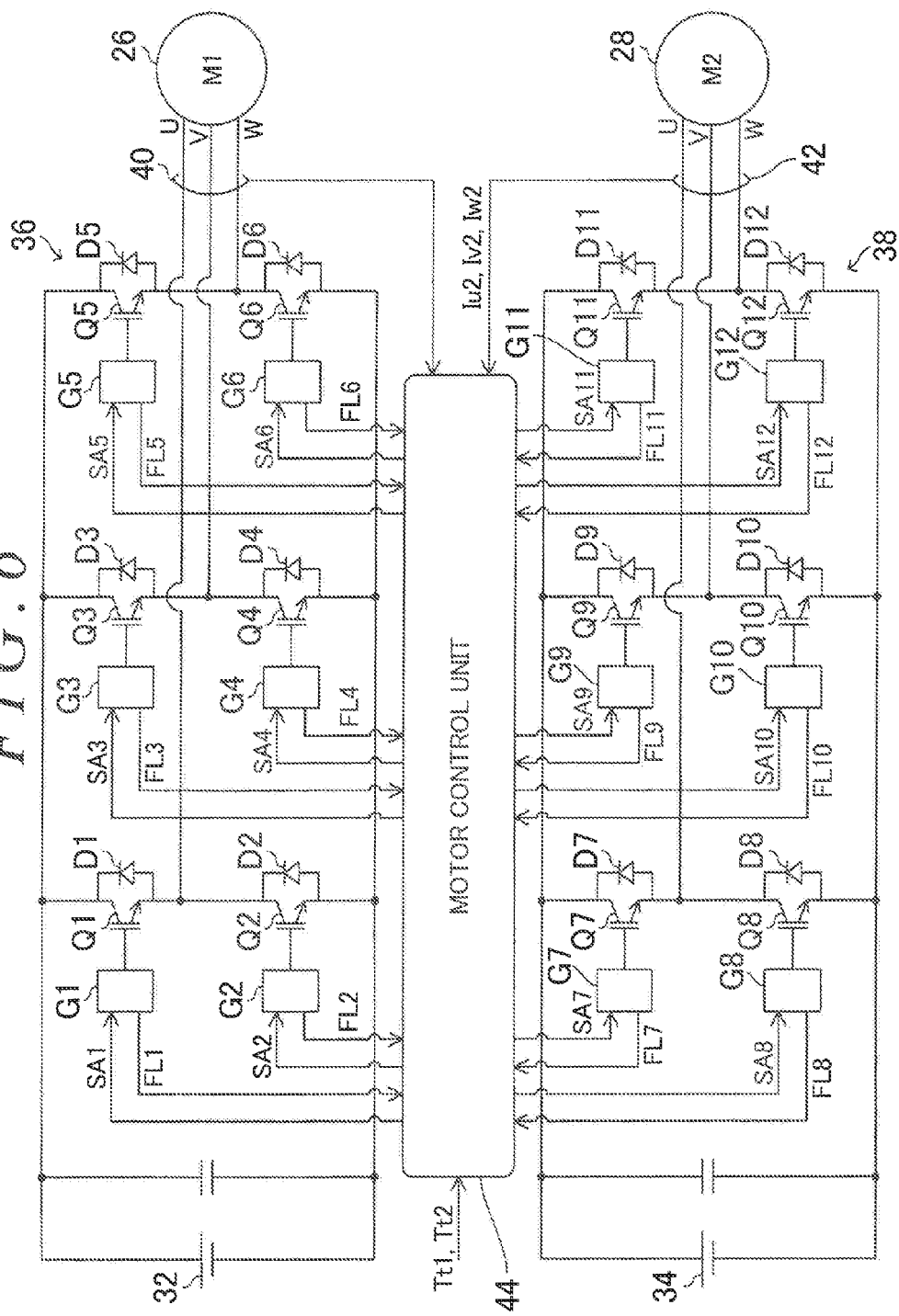
FIG. 6 is a circuit diagram illustrating the configuration of a first inverter circuit 36 and a second inverter circuit 38.

As illustrated in FIG. 6, the first inverter circuit 36 includes a plurality of first switching elements Q1 to Q6, a plurality of diodes D1 to D6, and a plurality of drive circuits G1 to G6. The plurality of first switching elements Q1 to Q6 include the switching element Q1 provided between a U-phase terminal of the first motor 26 and a positive electrode of the first battery 32, the switching element Q2 provided between the U-phase terminal of the first motor 26 and a negative electrode of the first battery 32, the switching element Q3 provided between a V-phase terminal of the first motor 26 and the positive electrode of the first battery 32, the switching element Q4 provided between the V-phase terminal of the first motor 26 and the negative electrode of the first battery 32, the switching element Q5 provided between a W-phase terminal of the first motor 26 and the positive electrode of the first battery 32, and the switching element Q6 provided between the W-phase terminal of the first motor 26 and the negative electrode of the first battery 32. The plurality of switching elements Q1 to Q6 are each connected in reversely parallel to one corresponding diode out of the plurality of diodes D1 to D6. The plurality of switching elements Q1 to Q6 are each connected to one corresponding circuit out of the plurality of drive circuits G1 to G6. For each of the plurality of first switching elements Q1 to Q6, an insulated gate bipolar transistor (IGBT) or a metal-oxide-semiconductor field-effect transistor (MOSFET) may be used although the first switching elements Q1 to Q6 are not particularly limited thereto.

The second inverter circuit 38 includes a plurality of second switching elements Q7 to Q12, a plurality of diodes D7 to D12, and a plurality of drive circuits G7 to G12. The plurality of second switching elements Q7 to Q12 include the switching element Q7 provided between a U-phase terminal of the second motor 28 and a positive electrode of the second battery 34, the switching element Q8 provided between the U-phase terminal of the second motor 28 and a negative electrode of the second battery 34, the switching element Q9 provided between a V-phase terminal of the second motor 28 and the positive electrode of the second battery 34, the switching element Q10 provided between the V-phase terminal of the second motor 28 and the negative electrode of the second battery 34, the switching element Q11 provided between a W-phase terminal of the second motor 28 and the positive electrode of the second battery 34, and the switching element Q12 provided between the W-phase terminal of the second motor 28 and the negative electrode of the second battery 34. The plurality of switching elements Q7 to Q12 are each connected in reversely parallel to one corresponding diode out of the plurality of diodes D7 to D12. The plurality of switching elements Q7 to Q12 are each connected to one corresponding circuit out of the plurality of drive circuits G7 to G12. For the plurality of second switching elements Q7 to Q12, an IGBT or a MOSFET may be used although the second switching elements Q7 to Q12 are not particularly limited thereto.

As illustrated in FIG. 6, each of the plurality of first control signals SA1 to SA6 output by the motor control unit 44 are input into one corresponding circuit out of the plurality of drive circuits G1 to G6 of the first inverter circuit 36. Each of the plurality of drive circuits G1 to G6 turns on and off one element out of the plurality of switching elements Q1 to Q6 in response to one signal out of the received first control signals SA1 to SA6. Here, each of the plurality of first control signals SA1 to SA6 is a binary signal that changes between a high level and a low level. For example, one first control signal SA1 is input into the drive circuit G1 connected to one first switching element Q1. The drive circuit G1 turns on the corresponding first switching element Q1 when the received first control signal SA1 is at the high level. The drive circuit G1 turns off the corresponding first switching element Q1 when the received first control signal SA1 is at the low level. Similarly, other drive circuits G2 to G6 turn on the corresponding first switching elements Q2 to Q6 when the received first control signals SA2 to SA6 are at high level, respectively. The drive circuits G2 to G6 turn off the corresponding first switching elements Q2 to Q6 when the received first control signals SA2 to SA6 are at low level, respectively.

Similarly, each of the plurality of second control signals SA7 to SA12 output by the motor control unit 44 are input into one corresponding circuit out of the plurality of drive circuits G7 to G12 of the second inverter circuit 38. Each of the plurality of drive circuits G7 to G12 turns on and off one element out of the plurality of second switching elements Q7 to Q12 in response to one signal out of the received second control signals SA7 to SA12. Each of the plurality of second control signals SA7 to SA12 is also a binary signal that changes between a high level and a low level. For example, one second control signal SA7 is input into the drive circuit G7 connected to one second switching element Q7. The drive circuit G7 turns on the corresponding second switching element Q7 when the received second control signal SA7 is at the high level. The drive circuit G7 turns off the corresponding second switching element Q7 when the received second control signal SA7 is at the low level. Similarly, other drive circuits G8 to G12 turn on the corresponding second switching elements Q8 to Q12 when the received second control signals SA8 to SA12 are at high level, respectively. The drive circuits G8 to G12 turn off the corresponding second switching elements Q8 to Q12 when the received second control signals SA8 to SA12 are at low level, respectively.

The plurality of drive circuits G1 to G6 of the first inverter circuit 36 output the first supervisory signals FL1 to FL6, respectively. Each of the first supervisory signals FL1 to FL6 is a binary signal that changes between a low level indicative of normality and a high level indicative of abnormality. Each of the plurality of drive circuits G1 to G6 monitors normality or abnormality of one corresponding element out of the plurality of first switching elements Q1 to Q6. For example, one drive circuit G1 monitors one first switching element Q1 connected thereto. The drive circuit G1 outputs a low-level first supervisory signal FL1 when the first switching element Q1 is normal, and outputs a high-level first supervisory signal FL1 when abnormality occurs in the first switching element Q1. Examples of the abnormality of the first switching element Q1 detectable by the drive circuit G1 include an overcurrent of the first switching element Q1, overheating of the first switching element Q1, and a short circuit of the first switching element Q1. The drive circuit G1 also outputs a high-level first supervisory signal FL1 when the electric power to be supplied to the drive circuit G1 itself runs short (loss of power supply). Similarly, other drive circuits G2 to G6 normally output low-level first supervisory signals FL2 to FL6, respectively. When abnormality occurs in the corresponding first switching elements Q2 to Q6, or when loss of power supply occurs in the drive circuits G2 to G6 themselves, the drive circuits G2 to G6 output high-level first supervisory signals FL2 to FL6, respectively. The first supervisory signals FL1 to FL6 output by the plurality of drive circuits G1 to G6 are input into the motor control unit 44. The plurality of drive circuits G1 to G6 are examples of a device or a circuit that detects abnormality occurring in the first inverter circuit 36. The first inverter circuit 36 may include devices or circuits that detect various kinds of abnormality occurring in the first inverter circuit 36 in place of or in addition to the plurality of drive circuits G1 to G6.

The plurality of drive circuits G7 to G12 of the second inverter circuit 38 output the second supervisory signals FL7 to FL12, respectively. As in the aforementioned first inverter circuit 36, the plurality of drive circuits G7 to G12 normally output low-level second supervisory signals FL7 to FL12, respectively. When abnormality occurs in the corresponding second switching elements Q1 to Q12, or when loss of power supply occurs in the drive circuits G7 to G12 themselves, the drive circuits G7 to G12 output high-level second supervisory signals FL7 to FL12, respectively. The second inverter circuit 38 may also include devices or circuits that detect various kinds of abnormality occurring in the second inverter circuit 38 in place of or in addition to the plurality of drive circuits G7 to G12.

Figure 7:
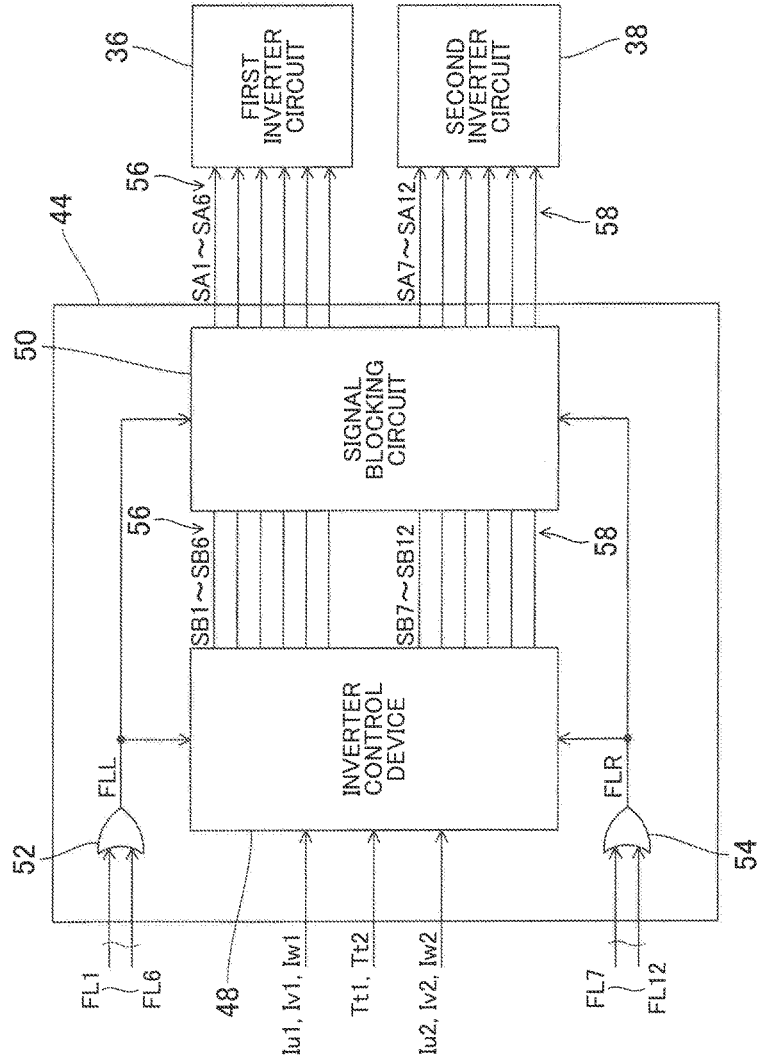
FIG. 7 is a block diagram schematically illustrating the configuration of a motor control unit 44 in a first embodiment.

The configuration of the motor control unit 44 will be described with reference to FIG. 7. The motor control unit 44 includes an inverter control device 48, a signal blocking circuit 50, and two OR gates 52, 54. The inverter control device 48 is configured with a processor (for example, a microcomputer) to perform various kinds of processings by executing preinstalled programs. The inverter control device 48 receives input of the torque target value Tt1 of the first motor 26, the torque target value Tt2 of the second motor 28, the current values Iu1, Iv1, Iw1 of the first motor 26, and the current values Iu2, Iv2, Iw2 of the second motor 28. The inverter control device 48 calculates an actual torque of the first motor 26 based on the current values Iu1, of the first motor 26. The inverter control device 48 then generates and outputs first switching signals SB1 to SB6 based on deviation of the torque target value Tt1 of the first motor 26 from the actual torque. Each of the first switching signals SP1 to SB6 is a pulse width modulation (PWM) control signal, which is a binary signal that changes between a high level and a low level. The first switching signals SB1 to SB6 by the inverter control device 48 are normally output from the motor control unit 44 through a plurality of first signal lines 56 and are input into the first inverter circuit 36 as the first control signals SA1 to SA6. As a consequence, the operation of the first motor 26 is feedback-controlled such that the actual torque of the first motor 26 becomes equal to the torque target value Tt1.

Similarly, the inverter control device 48 calculates an actual torque of the second motor 28 based on the current values Iu2, Iv2, Iw2 of the second motor 28. The inverter control device 48 then generates and outputs second switching signals SB7 to SB12 based on deviation of the torque target value Tt2 of the second motor 28 from the actual torque. Each of the second switching signals SB7 to SB12 is also a PWM control signal, which is a binary signal that changes between a high level and a low level. The second switching signals SB7 to SB12 by the inverter control device 48 are normally output from the motor control unit 44 through a plurality of second signal lines 58 and are input into the second inverter circuit 38 as the second control signals SA7 to SA12. As a consequence, the operation of the second motor 28 is feedback-controlled such that the actual torque of the second motor 28 becomes equal to the torque target value Tt2. Here, the control method of the first motor 26 and the second motor 28 by the inverter control device 48 is not particularly limited. In one example, vector control is adopted in the inverter control device 48 of the present embodiment.

One OR gate 52 receives the plurality of first supervisory signals FL1 to FL6, and outputs a single first integrated supervisory signal FLL. The first integrated supervisory signal FLL is a binary signal that changes between a high level and a low level. When all the plurality of first supervisory signals FL1 to FL6 are at a low level, the first integrated supervisory signal FLL is also at the low level. When at least one of the plurality of first supervisory signals FL1 to FL6 are at a high level, the first integrated supervisory signal FLL is at the high level. That is, when abnormality occurs in the first inverter circuit 36, the first integrated supervisory signal FLL become a high-level signal. The first integrated supervisory signal FLL is input into the inverter control device 48 and the signal blocking circuit 50.

Similarly, the other OR gate 54 receives the plurality of second supervisory signals FL7 to FL12, and outputs a single second integrated supervisory signal FLR. The second integrated supervisory signal FLR is also a binary signal that changes between a high level and a low level. When all the plurality of second supervisory signals FL7 to FL12 are at a low level, the second integrated supervisory signal FLR is also at the low level. When at least one of the plurality of second supervisory signals FL7 to FL12 are at a high level, the second integrated supervisory signal FLR is at the high level. That is, when abnormality occurs in the second inverter circuit 38, the second integrated supervisory signal becomes a high-level signal. The second integrated supervisory signal FLR is also input into the inverter control device 48 and the signal blocking circuit 50.

Upon reception of at least one of the high-level first integrated supervisory signal FLL and the high-level second integrated supervisory signal FLR, the inverter control device 48 disregards the torque target values Tt1, Tt2 from the integrated control unit 46, and fixes the first switching signals SB1 to SB6 and the second switching signals SB7 to SB12 to the low level. Once the first switching signals SB1 to SB6 are fixed to the low level, all the first switching elements Q1 to Q6 of the first inverter circuit 36 are turned off, and electric power supply to the first motor 26 is stopped. Similarly, once the level of the second switching signals SB7 to SB12 are fixed to the low level, all the second switching elements Q7 to Q12 of the second inverter circuit 38 are turned off, and electric power supply to the second motor 28 is stopped. Thus, when abnormality occurs at least one of the first inverter circuit 36 and the second inverter circuit 38, the inverter control device 48 generates and outputs the first switching signals SB1 to SB6 and the second switching signals SB7 to SB12 such that the electric power supply to both the first motor 26 and the second motor 28 are stopped.

The signal blocking circuit is interposed in the plurality of first signal lines 56 and the plurality of second signal lines 58. The signal blocking circuit 50 receives input of the first integrated supervisory signal FLL and the second integrated supervisory signal FLR. Upon reception of at least one of the high-level first integrated supervisory signal FLL and the high-level second integrated supervisory signal FLR, the signal blocking circuit 50 blocks the first switching signals SB1 to SB6 and the second switching signals SB7 to SB12 from the inverter control device 48, and outputs first OFF signals and second OFF signals in place of the blocked signals. The first OFF signals are signals of turning off all the first switching elements Q1 to Q6. In the present embodiment, the first OFF signal is fixed to a low level. The second OFF signals are signals of turning off all the second switching elements Q7 to Q12. In the present embodiment, the second OFF signals are fixed to a low level. The first OFF signals are input into the first inverter circuit 36 through the plurality of first signal lines 56 from the motor control unit 44 as the first control signals SA1 to SA6. The second OFF signals are input into the second inverter circuit 38 through the plurality of second signal lines 58 from the motor control unit 44 as the second control signals SA7 to SA12.

Figure 8:
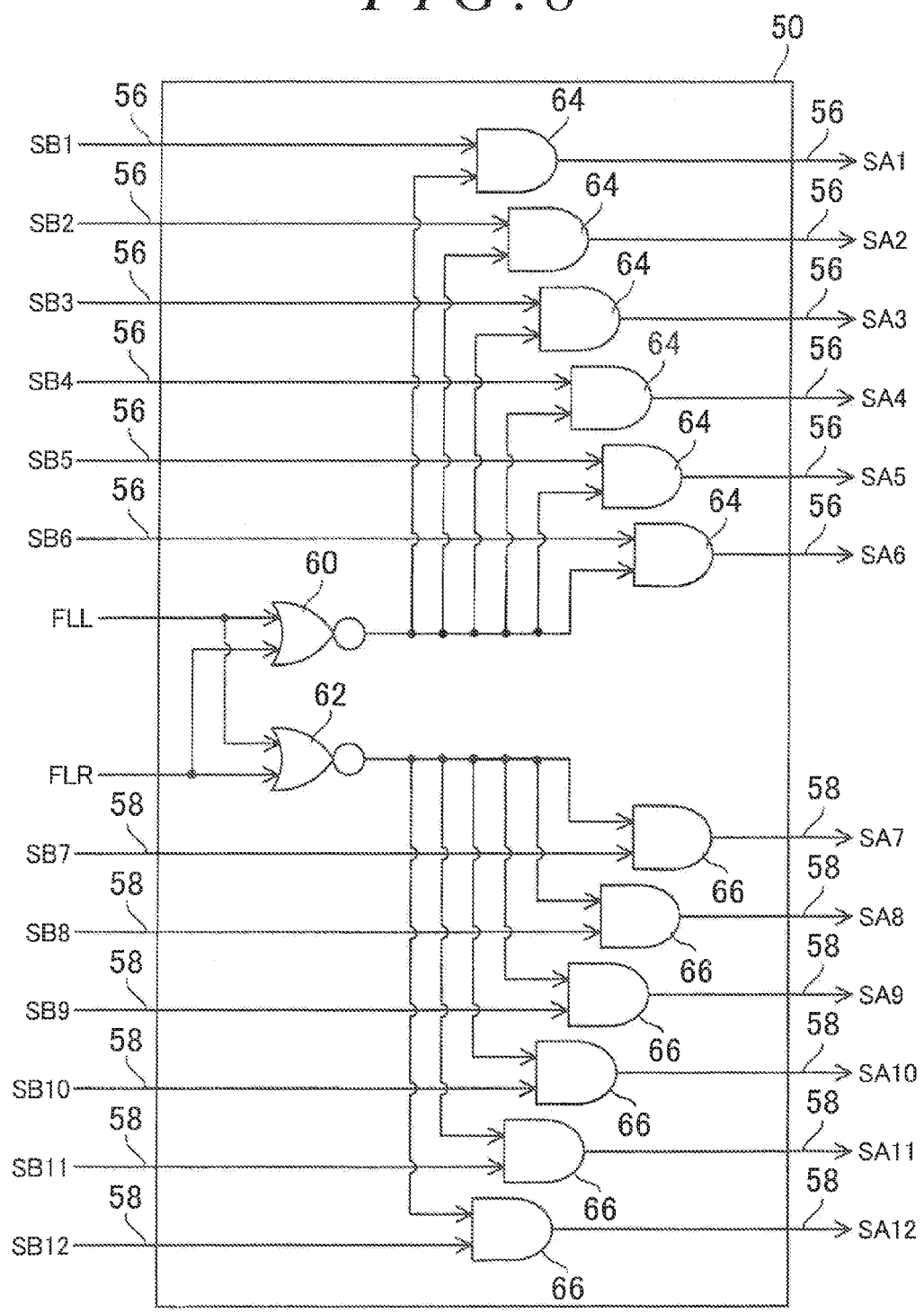
FIG. 8 is a block diagram schematically illustrating the configuration of a signal blocking circuit 50 in the first embodiment.

FIG. 8 illustrates the configuration of the signal blocking circuit 50 in the present embodiment. The configuration of the signal blocking circuit 50 described herein is merely an example, and the specific configuration thereof is not particularly limited. As illustrated in FIG. 8, the signal blocking circuit 50 includes a first NOR gate 60, a second NOR gate 62, a plurality of first AND gates 64, and a plurality of second AND gates 66. The first NOR gate 60 and the second NOR gate 62 receive input of the first integrated supervisory signal FLL and the second integrated supervisory signal FLR, respectively. The first NOR gate 60 and the second NOR gate 62 each output a high-level signal only if both the first integrated supervisory signal FLL and the second integrated supervisory signal FLR are at a low level. An output signal of the first NOR gate 60 is input into each of the plurality of first AND gates 64. An output signal of the second NOR gate 62 is input into each of the plurality of second AND gates 66. Each of the plurality of first AND gates 64 is interposed in one corresponding line out of the plurality of first signal lines 56. That is, the first control signals SA1 to SA6 from the inverter control device 48 are input into the plurality of first AND gates 64, respectively, together with the output signal of the first NOR gate 60. Output signals of the plurality of first AND gates 64 are output into the first inverter circuit 36 from the motor control unit 44 as the first control signals SA1 to SA6. Similarly, each of the plurality of second AND gates 66 is interposed in one corresponding line out of the plurality of second signal lines 58. That is, the second control signals SA7 to SA12 from the inverter control device 48 are input into the plurality of second AND gates 66, respectively, together with the output signal of the second NOR gate 62. Output signals of the plurality of second AND gates 66 are output to the second inverter circuit 38 from the motor control unit 44 as the second control signals SA7 to SA12.

FIG. 9 illustrates a truth table of the signal blocking circuit 50. In the table of FIG. 9, a column "FLL" indicates values of the first integrated supervisory signal FLL, and a column "FLR" indicates values of the second integrated supervisory signal FLR. A column "SB1 to SB6, SB7 to SB12" indicates values of the first switching signals SB1 to SB6 and the second switching signals SB7 to SB12 input into the signal blocking circuit 50. A column "SA1 to SA6, SA7 to SA12" indicates values of the first control signals SA1 to SA6 and the second control signals SA7 to SA12 output from the signal blocking circuit 50. In the table, a letter "H" represents a high level, and a letter "L" represents a low level. As is understood from FIGS. 8 and 9, when both the first integrated supervisory signal FLL, and the second integrated supervisory signal are at a low level, the first switching signals SB1 to SB6 and the second switching signals SB7 to SB12 input into the signal blocking circuit 50 become equal to the first control signals SA1 to SA6 and the second control signals SA7 to SA12 output from the signal blocking circuit 50. That is, when both the first inverter circuit 36 and the second inverter circuit 38 are normal, the first switching signals SB1 to SB6 and the second switching signals SB7 to SB12 by the inverter control device 48 are input into the first inverter circuit 36 and the second inverter circuit 38 as the first control signals SA1 to SA6 and the second control signals SA7 to SA12, respectively. When at least one of the first integrated supervisory signal FLL and the second integrated supervisory signal FLR is at a high level, the first control signals SA1 to SA6 and the second control signals SA7 to SA12 output from the signal blocking circuit 50 are fixed to a low level irrespective of the values of the first switching signals SB1 to SB6 and the second switching signals SB7 to SB12. The first control signals SA1 to SA6 fixed to the low level are signals that turn off all the first switching elements Q1 to Q6 of the first inverter circuit 36. The signals are examples of the first OFF signals described before. Similarly, the second control signals SA7 to SA12 fixed to a low level are signals that turn off all the second switching elements Q7 to Q12 of the second inverter circuit 38. The signals are examples of the second OFF signals described before.

Figure 10:
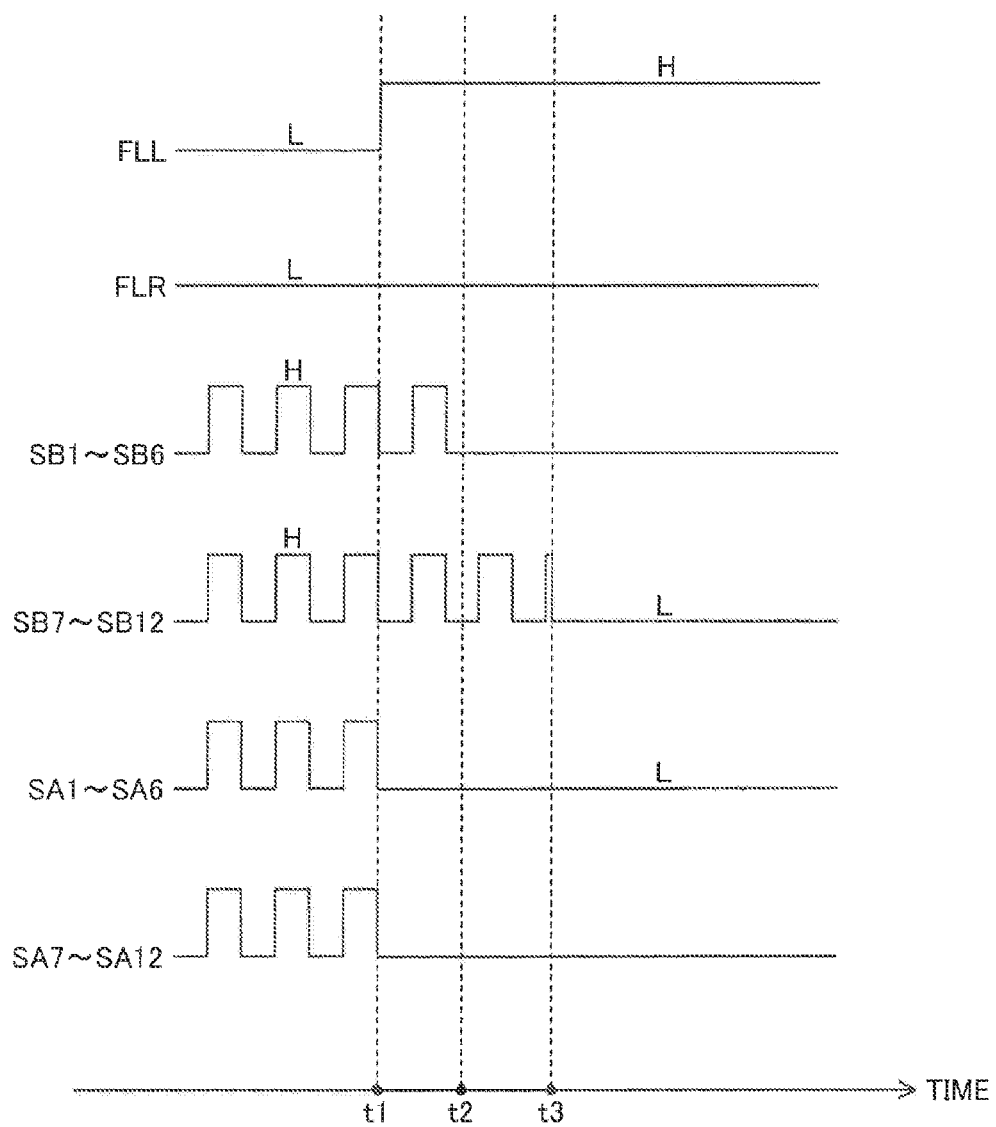
FIG. 10 is a time chart illustrating an operation flow of the motor control unit 44 in the first embodiment.

With reference to FIG. 10, the operation of the motor control unit 44 will be described with the case where abnormality occurs in any one of the first switching elements Q1 to Q6 as an example. When abnormality occurs at time t1 in any one of the first switching elements Q1 to Q6, a high-level first integrated supervisory signal FLL is input into the inverter control device 48 and the signal blocking circuit 50. Upon reception of the high-level first integrated supervisory signal FLL, the inverter control device 48 fixes all the first switching signals SB1 to SB6 and the second switching signals SB7 to SB12 to a low level in order to stop electric power supply to the first motor 26 and the second motor 28. However, the inverter control device 48 is configured with a processor, so that a plurality of preset processings are sequentially executed one at a time based on installed programs. Therefore, the processing of fixing the first switching signals SB1 to SB6 to a low level is completed at time t2 that is later than time t1. The processing of fixing the second switching signals SB7 to SB12 to a low level is completed at time t3 that is still later than time t2. A period of time from time t1 to time t2 and a period of time from time t2 to time t3 are several microseconds to tens of microseconds in one example.

Here, assume that the signal blocking circuit 50 does not exist. In this case, the first switching signals SB1 to SB6 and the second switching signals SB7 to SB12 output by the inverter control device 48 are input into the first inverter circuit 36 and the second inverter circuit 38, respectively. Between time t1 and time t2, electric power continues to be supplied to the first motor 26 through the first inverter circuit 36 where abnormality occurred. In this case, the first motor 26 is not appropriately controlled, so that the electric vehicle 10 may exhibit unintended behavior. Between time t2 and time t3, electric power supply to the first motor 26 is stopped, while electric power supply to the second motor 28 is continued. In this case, only the second motor 28 is driven, which may cause the electric vehicle 10 to exhibit unintended behavior. Thus, without the signal blocking circuit 50, it is impossible to stop electric power supply to the first motor 26 and the second motor 28 concurrently in a short time after abnormality occurs in the first inverter circuit 36 or the second inverter circuit 38. As a result, the electric vehicle 10 may exhibit unintended behavior.

In contrast, when the signal blocking circuit 50 exists as in the present embodiment, the first control signals SA1 to SA6 input into the first inverter circuit 36 are fixed to a low level at time t1 when the signal blocking circuit 50 receives the high-level first integrated supervisory signal FLL. Similarly, the second control signals SA7 to SA12 input into the second inverter circuit 38 are also fixed to a low level at time t1. As a result, electric power supply to the first motor 26 and the second motor 28 is stopped at the same time.

According to the configuration of the present embodiment, when abnormality occurs in at least one of the first inverter circuit 36 and the second inverter circuit 38, all the first switching elements Q1 to Q6 of the first inverter circuit 36 and all the second switching elements Q7 to Q12 of the second inverter circuit 38 can concurrently be turned off. Therefore, since electric power supply to the first motor 26 and the second motor 28 is concurrently stopped, it becomes possible to stop the electric vehicle 10 while avoiding or suppressing the unintended behavior of the electric vehicle 10.

Second Embodiment

A description is given of an electric vehicle of the second embodiment. The electric vehicle of the second embodiment is similar to the electric vehicle 10 of the first embodiment with the configuration of the motor control unit 44 being changed. Hereinafter, the difference from the first embodiment is mainly described. The electric vehicle of the second embodiment has the same configuration and functions as the first embodiment unless specifically mentioned.

Figure 11:
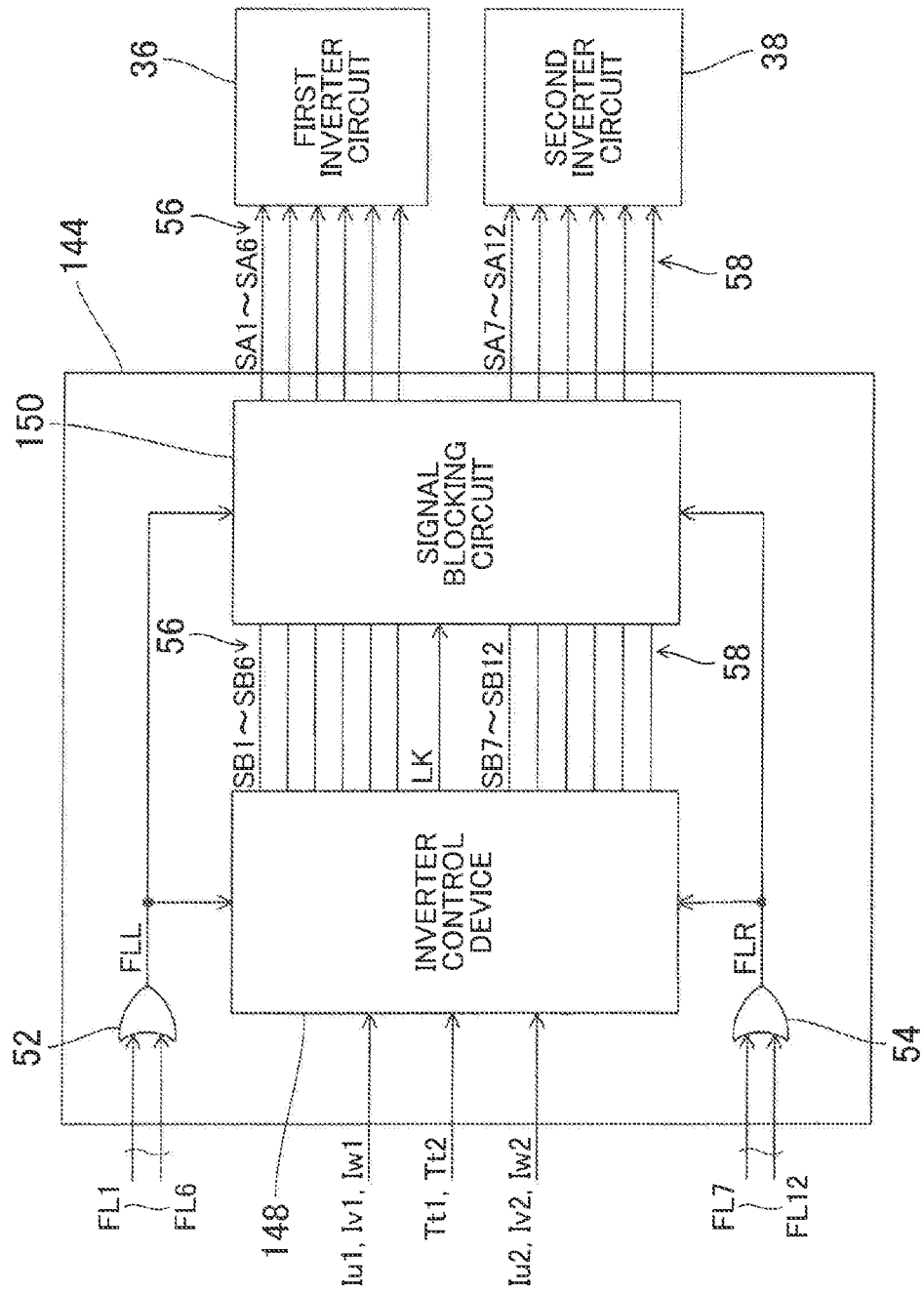
FIG. 11 is a block diagram schematically illustrating the configuration of a motor control unit 144 in a second embodiment.

As illustrated in FIG. 11, a motor control unit 144 in the second embodiment includes an inverter control device 148, a signal blocking circuit 150, and two OR gates 52, 54. The inverter control device 148 has all the configuration and the functions of the inverter control device 48 described in the first embodiment. Furthermore, the inverter control device 148 of the present embodiment is configured to output a link signal LK. The link signal LK is a binary signal that changes between a low level and a high level. The condition under which the inverter control device 148 changes the level of the link signal LK between the low level and the high level will be described later. The link signal LK output by the inverter control device 148 is input into the signal blocking circuit 150. The two OR gates 52, 54 are as described in the first embodiment.

Figure 12:
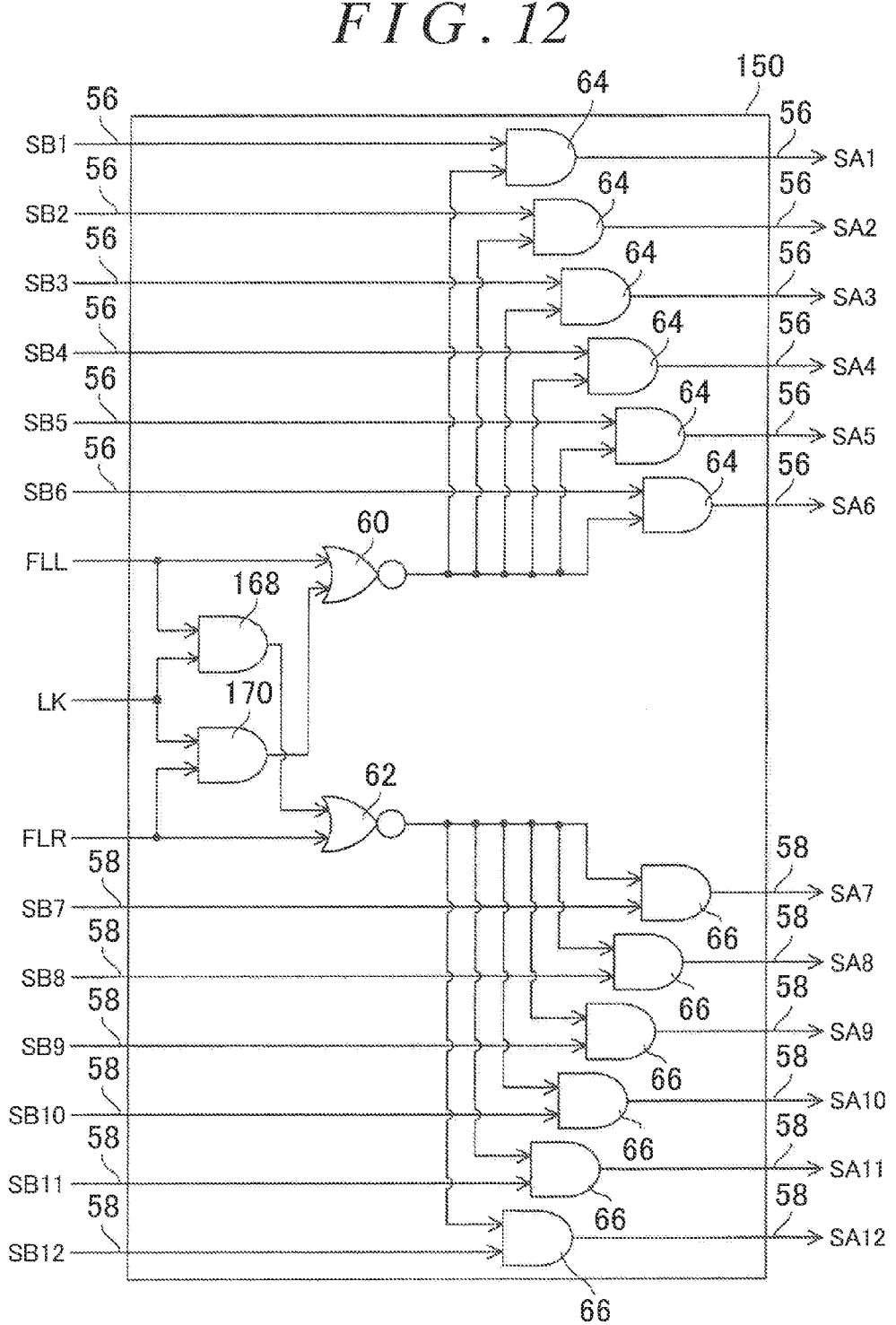
FIG. 12 is a block diagram schematically illustrating the configuration of a signal blocking circuit 150 in the second embodiment.

As illustrated in FIG. 12, the signal blocking circuit 150 in the present embodiment includes the first NOR gate 60, the second NOR gate 62, the plurality of first AND gates 64, and the plurality of second AND gates 66. In addition, the signal blocking circuit 150 further includes a third AND gate 168 and a fourth AND gate 170. The third AND gate 168 receives input of the first integrated supervisory signal FLL and the link signal LK output from the inverter control device 148. An output signal of the third AND gate 168 is at a high level when both the first integrated supervisory signal FLL and the link signal LK are at the high level. Otherwise, the output signal of the third AND gate 168 is at a low level. The output signal of the third AND gate 168 is input into the second NOR gate 62. The second NOR gate 62 receives the output signal of the third AND gate 168 and the second integrated supervisory signal FLR. The second NOR gate 62 outputs a high-level signal when both the output signal of the third AND gate 168 and the second integrated supervisory signal FLR are at a low level. Otherwise, the second NOR gate 62 outputs a low-level signal. The output signal of the second NOR gate 62 is input into each of the plurality of second AND gates 66. Each of the plurality of second AND gates 66 receives the output signal of the second NOR gate 62 and one corresponding signal out of the plurality of second switching signals SB7 to SB12.

The fourth AND gate 170 receives input of the second integrated supervisory signal FLR and the link signal LK output from the inverter control device 148. The fourth AND gate 170 outputs a high-level signal when both the second integrated supervisory signal FLR and the link signal LK are at a high level. Otherwise, the fourth AND gate 170 outputs a low-level signal. The output signal of the fourth AND gate 170 is input into the first NOR gate 60. The first NOR gate 60 receives the output signal of the fourth AND gate 170 and the first integrated supervisory signal FLL. The output signal of the first NOR gate 60 becomes a high level when both the output signal of the fourth AND gate 170 and the first integrated supervisory signal FLL are at a low level. Otherwise, the output signal of the first NOR gate 60 is a low level. The output signal of the first NOR gate 60 is input into each of the plurality of first AND gates 64. Each of the plurality of first AND gates 64 receives the output signal of the first NOR gate 60 and one corresponding signal out of the plurality of first switching signals SB1 to SB6.

FIG. 13 illustrates a truth table of the signal blocking circuit 150 in the present embodiment. In the table of FIG. 13, a column "LINK" indicates values of the link signal LK, a column "FLL" indicates values of the first integrated supervisory signal FLL, and a column "FLR" indicates values of the second integrated supervisory signal FLR. A column "SB1 to SB6" indicates values of the first switching signals SB1 to SB6 input into the signal blocking circuit 150, and a column "SA1 to SA6" indicates values of the first control signals SA1 to SA6 output from the signal blocking circuit 150. A column "SB7 to SB12" indicates values of the second switching signals SB7 to SB12 input into the signal blocking circuit 150, and a column "SA7 to SA12" indicates values of the second control signals SA7 to SA12 output from the signal blocking circuit 150. In the table, a letter "H" represents a high level, and a letter "L" represents a low level.

As illustrated in FIG. 13, when the link signal LK is at a high level, the signal blocking circuit 150 in the present embodiment functions in a similar manner as the signal blocking circuit 50 in the first embodiment. More specifically, when both the first integrated supervisory signal FLL and the second integrated supervisory signal FLR are at a low level, the first switching signals SB1 to SB6 and the second switching signals SB7 to SB12 input into the signal blocking circuit 50 become equal to the first control signals SA1 to SA6 and the second control signals SA7 to SA12 output from the signal blocking circuit 50. On the contrary, when at least one of the first integrated supervisory signal FLL and the second integrated supervisory signal FLR is at a high level, the first control signals SA1 to SA6 and the second control signals SA7 to SA12 output from the signal blocking circuit 50 are fixed to a low level irrespective of the values of the first switching signals SB1 to SB6 and the second switching signals SB7 to SB12. As a result, all the first switching elements Q1 to Q6 of the first inverter circuit 36 and all the second switching elements Q7 to Q12 of the second inverter circuit 38 can concurrently be turned off.

Meanwhile, when the link signal LK becomes a low level, the signal blocking circuit 150 exhibits different operation. For example, suppose that the link signal LK is at a low level, the first integrated supervisory signal FLL is at a high level, and the second integrated supervisory signal FLR is at a low level. This indicates that abnormality is occurring in the first inverter circuit 36, while the second inverter circuit 38 is normal. In this case, the first control signals SA1 to SA6 output from the signal blocking circuit 150 are fixed to a low level irrespective of the first switching signals SB1 to SB6. That is, the first inverter circuit 36 having abnormality receives input of low-level first control signals SA1 to SA6 in place of the first switching signals SB1 to SB6 from the inverter control device 148. On the contrary, the second control signals SA7 to SA12 output from the signal blocking circuit 150 become equal to the second switching signals SB7 to SB12 input into the signal blocking circuit 150. That is, the normal second inverter circuit 38 receives input of the second switching signals SB7 to SB12 from the inverter control device 148 as the second control signals SA7 to SA12. Thus, in the motor control unit 144 in the present embodiment, when the inverter control device 148 outputs a low-level link signal LK while abnormality is occurring in the first inverter circuit 36, the normal second inverter circuit 38 receives input of the second switching signals SB7 to SB12 from the inverter control device 148 as the second control signals SA1 to SA12. As a consequence, the motor control unit 144 can control the operation of the second motor 28 using the normal second inverter circuit 38. Similarly, when the inverter control device 148 outputs a low-level link signal LK while abnormality is occurring in the second inverter circuit 38, the normal first inverter circuit 36 receives input of the first switching signals SB1 to SB6 from the inverter control device 148 as the first control signals SA1 to SA6. As a consequence, the motor control unit 144 can control the operation of the first motor 26 using the normal first inverter circuit 36.

Figure 14:
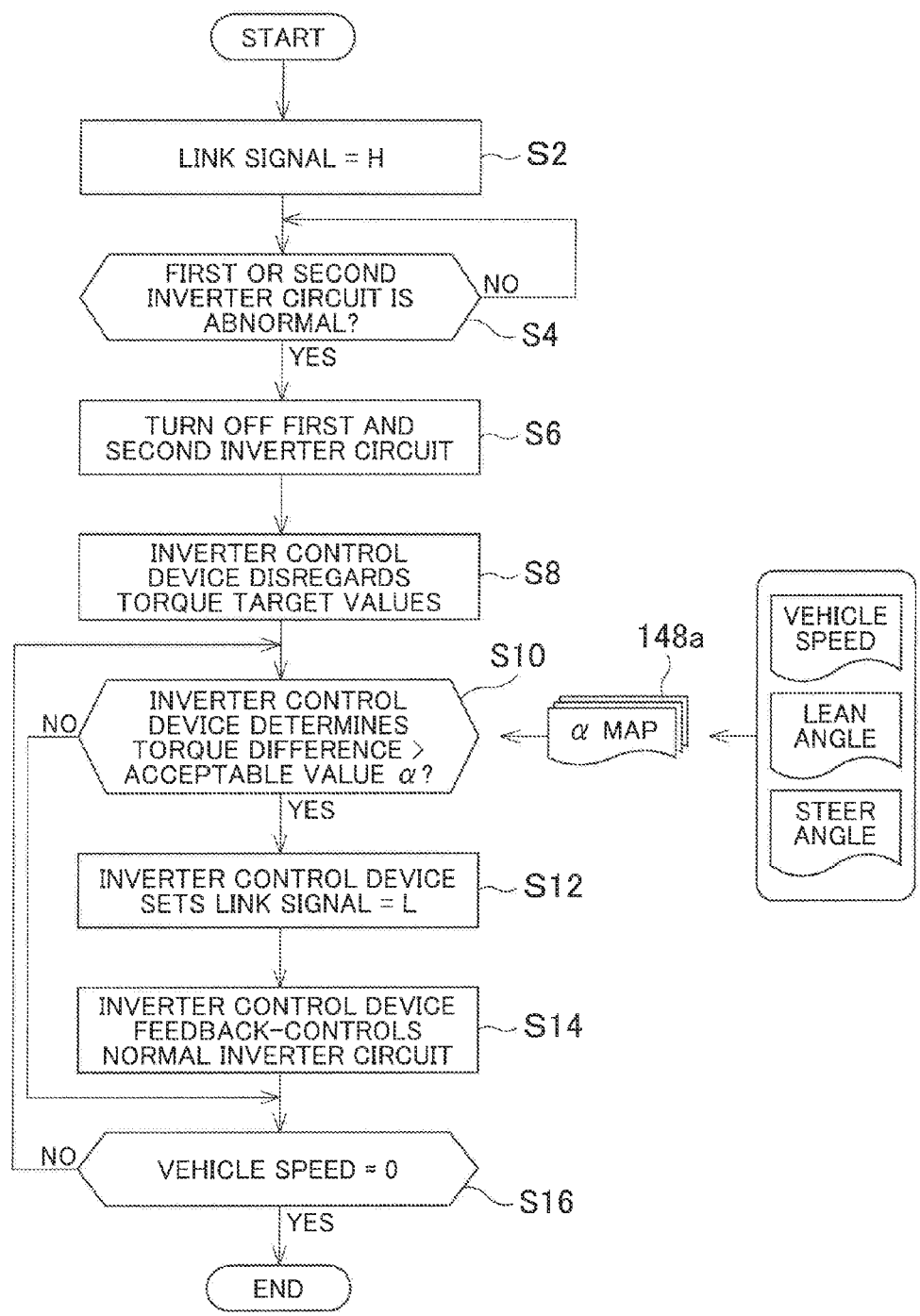
FIG. 14 is a flowchart illustrating an operation flow of the motor control unit 144 in the second embodiment.
Figure 15:
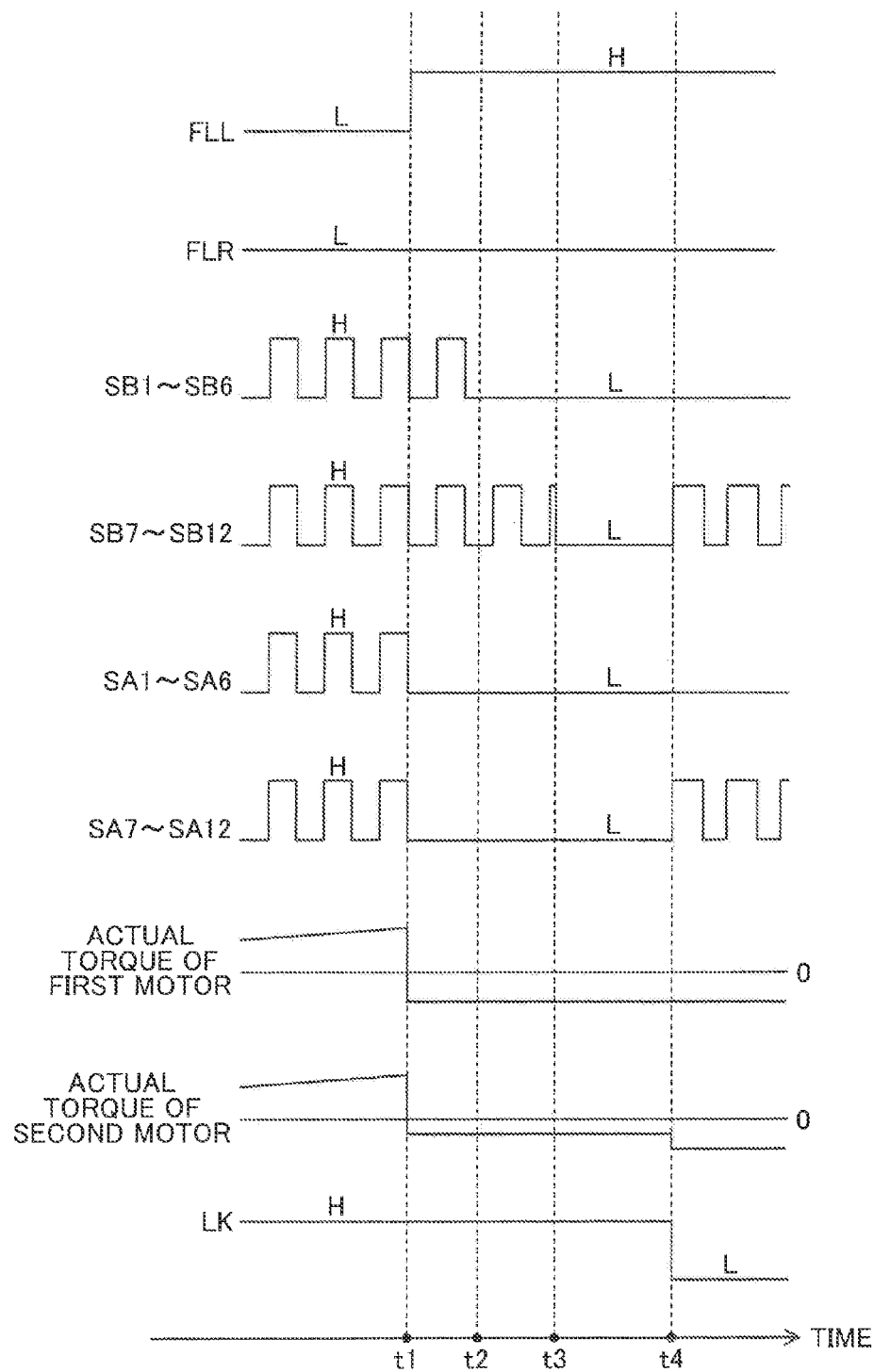
FIG. 15 is a time chart illustrating an operation flow of the motor control unit 144 in the second embodiment.

With reference to FIGS. 14 and 15, the operation of the motor control unit 144 in the present embodiment will be described with the case where abnormality occurs in the first inverter circuit 36 as an example. Generally, the inverter control device 148 outputs a high-level link signal LK (step S2). When abnormality occurs at time t1 in any one of the first switching elements Q1 to Q6 (YES in step S4), a high-level first integrated supervisory signal FLL is input into the inverter control device 148 and the signal blocking circuit 150. Here, assume that abnormality does not occur in the second inverter circuit 38, and the second integrated supervisory signal FLR is at a low level. Upon reception of the high-level first integrated supervisory signal the signal blocking circuit 150 outputs to the first inverter circuit 36 and the second inverter circuit 38 low-level signals (that is, first OFF signals and second OFF signals) in place of the first switching signals SB1 to SB6 and the second switching signals SB7 to SB12 output by the inverter control device 148. As a consequence, all the first switching elements Q1 to Q6 of the first inverter circuit 36 and all the second switching elements Q7 to Q12 of the second inverter circuit 38 are turned off, so that electric power supply to the first motor 26 and the second motor 28 is concurrently stopped (step S6).

Upon reception of the high-level first integrated supervisory signal FLL, the inverter control device 148 disregards torque target values Tt1, Tt2 from the integrated control unit 46, and fixes the first switching signals SB1 to SB6 and the second switching signals SB7 to SB12 to a low level (step S8). As described in the first embodiment, the processing of fixing the first switching signals SB1 to SB6 to a low level is completed at time t2 that is later than time t1. The processing of fixing the second switching signals SB7 to SB12 to a low level is completed at time t3 that is still later than time t2 (see FIG. 15).

Figure 16:
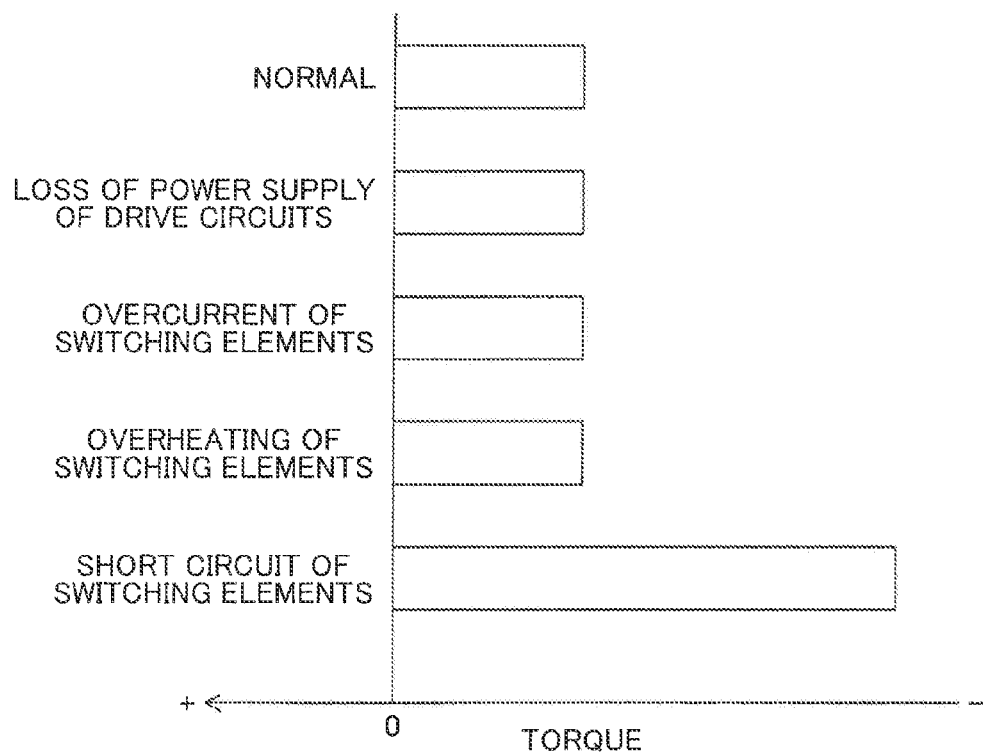
FIG. 16 is a graph view schematically illustrating the relation between negative torque and the state of the first inverter circuit 36, the negative torque being output by the first motor 26 when all the first switching elements Q1 to Q6 of the first inverter circuit 36 are turned off. The relation illustrated in FIG. 16 is also applied to the second motor 28 and the second inverter circuit 38.

Then, the inverter control device 148 monitors a torque difference between the first motor 26 and the second motor 28. When electric power supply to the first motor 26 and the second motor 28 is stopped during traveling of the electric vehicle (on and after time t1 in FIG. 15), both the first motor 26 and the second motor 28 output a negative torque. Here, as illustrated in FIG. 16, the magnitude of the negative torque output by the first motor 26 varies in accordance with the state of the first inverter circuit 36. When the abnormality occurring in the first inverter circuit 36 is one of the loss of power supply of the drive circuits G1 to G6, the overcurrent of the first switching elements Q1 to Q6, and the overheating of the first switching elements Q1 to Q6, the magnitude of the negative torque output by the first motor 26 becomes substantially equal to the value obtained when the first inverter circuit 36 is normal. This is because even when these abnormalities occur, all the first switching elements Q1 to Q6 of the first inverter circuit 36 can be turned off as when the first inverter circuit 36 is normal. However, when the abnormality occurring in the first inverter circuit 36 is a short fault of any one of the first switching elements Q1 to Q6, the magnitude of the negative torque output by the first motor 26 becomes significantly larger than that in other abnormality cases. When the short fault occurs in any one of the first switching elements Q1 to Q6, a short circuit is formed between the first motor 26 and the first inverter circuit 36, so that the first motor 26 outputs a large braking torque (negative torque). As a result, even when electric power supply to both the first motor 26 and the second motor 28 is stopped, a large torque difference may be generated between the first motor 26 and the second motor 28. With the large torque difference generated between the first motor 26 and the second motor 28, the electric vehicle may exhibit unintended behavior such as the electric vehicle making a sharp turn. The above description also applies to the second motor 28. The magnitude of the negative torque output by the second motor 28 varies in accordance with the state of the second inverter circuit 38 connected to the second motor 28 as illustrated in FIG. 16.

Therefore, when the torque difference between the first motor 26 and the second motor 28 exceeds an acceptable value α (YES in step S10), the inverter control device 148 changes the link signal LK from a high level to a low level (step S12). The acceptable value α used herein may be a fixed value or a value variable in accordance with the traveling status of the electric vehicle or the operation status of a driver. The inverter control device 148 in the present embodiment determines the acceptable value α in accordance with a vehicle speed of the electric vehicle, a lean angle of the electric vehicle, and an operation amount (steer angle) applied to the steering device 16 by the driver. Accordingly, the inverter control device 148 stores a three-dimensional map 148a that states the acceptable value α in accordance with the vehicle speed, the lean angle, and the steer angle described before. The inverter control device 148 acquires indexes, such as the vehicle speed, the lean angle, and the steer angle, from the integrated control unit 46, and determines the acceptable value α from the three-dimensional map 148a based on the indexes. The inverter control device 148 may determine the acceptable value α in accordance with at least one of the vehicle speed, the lean angle, and the steer angle described above or in accordance with other indexes. Accordingly, the torque difference between the first motor 26 and the second motor 28 can appropriately be restricted in accordance with the traveling state of the electric vehicle.

As described before, the inverter control device 148 becomes to be able to control the operation of the second motor 28 again by outputting a low-level link signal LK. The inverter control device 148 generates the second switching signals SB7 to SB12 so as to decrease a torque difference between the first motor 26 and the second motor 28. As a result, the operation of the normal second inverter circuit 38 (i.e., the operation of the second motor 28) is feedback-controlled (step S14). Accordingly, as illustrated in FIG. 15, the torque difference between the first motor 26 and the second motor 28 is reduced on and after time t4, and the behavior of the electric vehicle is stabilized. The inverter control device 148 repeatedly executes the feedback control (steps S10 to S14) corresponding to the torque difference stated above until the electric vehicle stops (YES in step S16).

As described in the foregoing, after receiving the high-level first integrated supervisory signal FLL, the inverter control device 148 monitors the torque difference between the first motor 26 and the second motor 28. When the torque difference exceeds the acceptable value α and the second integrated supervisory signal FLR is at a low level (i.e., when the second inverter circuit 38 is normal), the inverter control device 148, changes the link signal to a low level, and generates and outputs the second switching signals SB7 to SB12 so as to decrease the torque difference. The second switching signals SB7 to SB12 are input into the second inverter circuit 38 in place of the second OFF signals. As a result, the feedback control of the second motor 28 is performed. Similarly, the inverter control device 148 monitors the torque difference between the first motor 26 and the second motor 28 even after receiving the high-level second integrated supervisory signal FLR. When the torque difference exceeds the acceptable value α and the first integrated supervisory signal FLL is at a low level (i.e., when the first inverter circuit 36 is normal), the inverter control device 148 changes the link signal to a low level, and generates and outputs the first switching signals SB1 to SB6 so as to decrease the torque difference. The first switching signals SB1 to SB6 are input into the first inverter circuit 36 in place of the first OFF signals. As a result, the feedback control of the first motor 26 is performed.

According to the configuration of the present embodiment, when abnormality occurs in at least one of the first inverter circuit 36 and the second inverter circuit 38, all the first switching elements Q1 to Q6 of the first inverter circuit 36 and all the second switching elements Q7 to Q12 of the second inverter circuit 38 can concurrently be turned off.

Then, when a measurable torque difference is generated between the first motor 26 and the second motor 28, the first motor 26 or the second motor 28 can be controlled using the normal first inverter circuit 36 or second inverter circuit 38 such that the torque difference is reduced. As a consequence, it becomes possible to stop the electric vehicle while suppressing the unintended behavior of the electric vehicle.

The technical components of the embodiment described in the foregoing will be described below. The technical components described below are each useful independently.

In the electric vehicle disclosed in this specification, a first abnormality signal and a second abnormality signal are also preferably input into the inverter control device. In this case, the inverter control device monitors a torque difference between the first motor and the second motor after receiving a first abnormality signal or a second abnormality signal. When the torque difference exceeds a specified acceptable value and the first abnormality signal is not received, the inverter control device may transmit a cancel signal to the signal blocking circuit, while generating and outputting first switching signals so as to decrease the torque difference. Or when the torque difference exceeds the acceptable value, and the second abnormality signal is not received, the inverter control device may transmit a cancel signal to the signal blocking circuit, while generating and outputting second switching signals so as to decrease the torque difference. When receiving the first abnormality signal and then further receiving the cancel signal, the signal blocking circuit may output to the second inverter circuit the second switching signals from the inverter control device in place of the second OFF signals. Or when receiving the second abnormality signal and then further receiving the cancel signal, the signal blocking circuit may output to the first inverter circuit the first switching signals from the inverter control device in place of the first OFF signals.

According to the above-mentioned configuration, when a measurable torque difference is generated between the first motor and the second motor, the inverter control device can control the first motor or the second motor using the normal first inverter circuit or second inverter circuit so as to reduce the torque difference. As a consequence, it becomes possible to stop the electric vehicle while suppressing the unintended behavior of the electric vehicle.

The inverter control device may determine the acceptable value in accordance with at least one of a vehicle speed, a lean angle, and a steer angle of the electric vehicle. According to such configuration, the torque difference between the first motor and the second motor can appropriately be restricted in accordance with the traveling state of the electric vehicle.

Although the embodiments have been described in detail in the foregoing, the embodiments are merely illustrative and are not intended to limit the present disclosure. The technology according to the present disclosure includes various modifications and deformations of the specific examples described in the foregoing. The technology components described in this specification or in the drawings demonstrate technical usefulness independently or in various kinds of combinations. Therefore, the technology components are not limited to the combinations disclosed in the claims at the time of application. The technology disclosed in this specification or in the drawings concurrently achieve a plurality of objects. Accomplishing one of the objects itself provides the technical usefulness.

What is claimed is:

1. An electric vehicle, comprising:
 a vehicle body;
 a pair of wheels provided in a vehicle width direction of the vehicle body;
 a first motor that drives one of the wheels;
 a second motor that drives the other of the wheels;
 a first inverter circuit having a plurality of first switching elements, the first inverter circuit being configured to supply alternating current electric power to the first motor;
 a second inverter circuit having a plurality of second switching elements, the second inverter circuit being configured to supply alternating current electric power to the second motor;
 an inverter control device configured to output first switching signals that control operation of the plurality of first switching elements and second switching signals that control operation of the plurality of second switching elements;
 a first abnormality detection device configured to output a first abnormality signal when abnormality occurs in the first inverter circuit;
 a second abnormality detection device configured to output a second abnormality signal when abnormality occurs in the second inverter circuit;
 a plurality of first signal lines configured to transfer the first switching signals from the inverter control device to the first inverter circuit;
 a plurality of second signal lines configured to transfer the second switching signals from the inverter control device to the second inverter circuit; and
 a signal blocking circuit inserted in the plurality of first signal lines and the plurality of second signal lines, the signal blocking circuit receiving input of the first abnormality signal and the second abnormality signal, the signal blocking circuit being configured to output to the first inverter circuit first OFF signals in place of the first switching signals from the inverter control device and concurrently output to the second inverter circuit second OFF signals in place of the second switching signals from the inverter control device when receiving at least one of the first abnormality signal and the second abnormality signal, the first OFF signals being signals of turning off the plurality of first switching elements, and the second OFF signals being signals of turning off the plurality of second switching elements.

2. The electric vehicle according to claim 1, wherein
 the signal blocking circuit is configured to
 output to the second inverter circuit the second OFF signals in place of the second switching signals from the inverter control device when receiving the first abnormality signal, and
 output to the first inverter circuit the first OFF signals in place of the first switching signals from the inverter control device when receiving the second abnormality signal.

3. The electric vehicle according to claim 1, wherein
 the first abnormality signal and the second abnormality signal are input into the inverter control device,
 the inverter control device is configured to
 acquire a torque difference between the first motor and the second motor after receiving the first abnormality signal or the second abnormality signal,
 transmit a signal to cause the signal blocking circuit to cancel output of the first OFF signals while generating and outputting the first switching signals so as to decrease the torque difference, when the torque difference exceeds a specified acceptable value and the first abnormality signal is not received, and transmit a signal to cause the signal blocking circuit to cancel output of the second OFF signals, while generating and outputting the second switching signals so as to decrease the torque difference, when the torque difference exceeds the specified acceptable value and the second abnormality signal is not received, and the signal blocking circuit is configured to output to the second inverter circuit the second switching signals from the inverter control device in place of the second OFF signals, when receiving the first abnormality signal and then further receiving the signal to cancel output of the second OFF signals from the inverter control device, and output to the first inverter circuit the first switching signals from the inverter control device in place of the first OFF signals, when receiving the second abnormality signal and then further receiving the signal to cancel output of the first OFF signals from the inverter control device.

4. The electric vehicle according to claim 3, wherein the inverter control device determines the acceptable value in accordance with at least one of a vehicle speed, a lean angle, and a steer angle of the electric vehicle.

\* \* \* \* \*